UNITED STATES PATENT OFFICE.

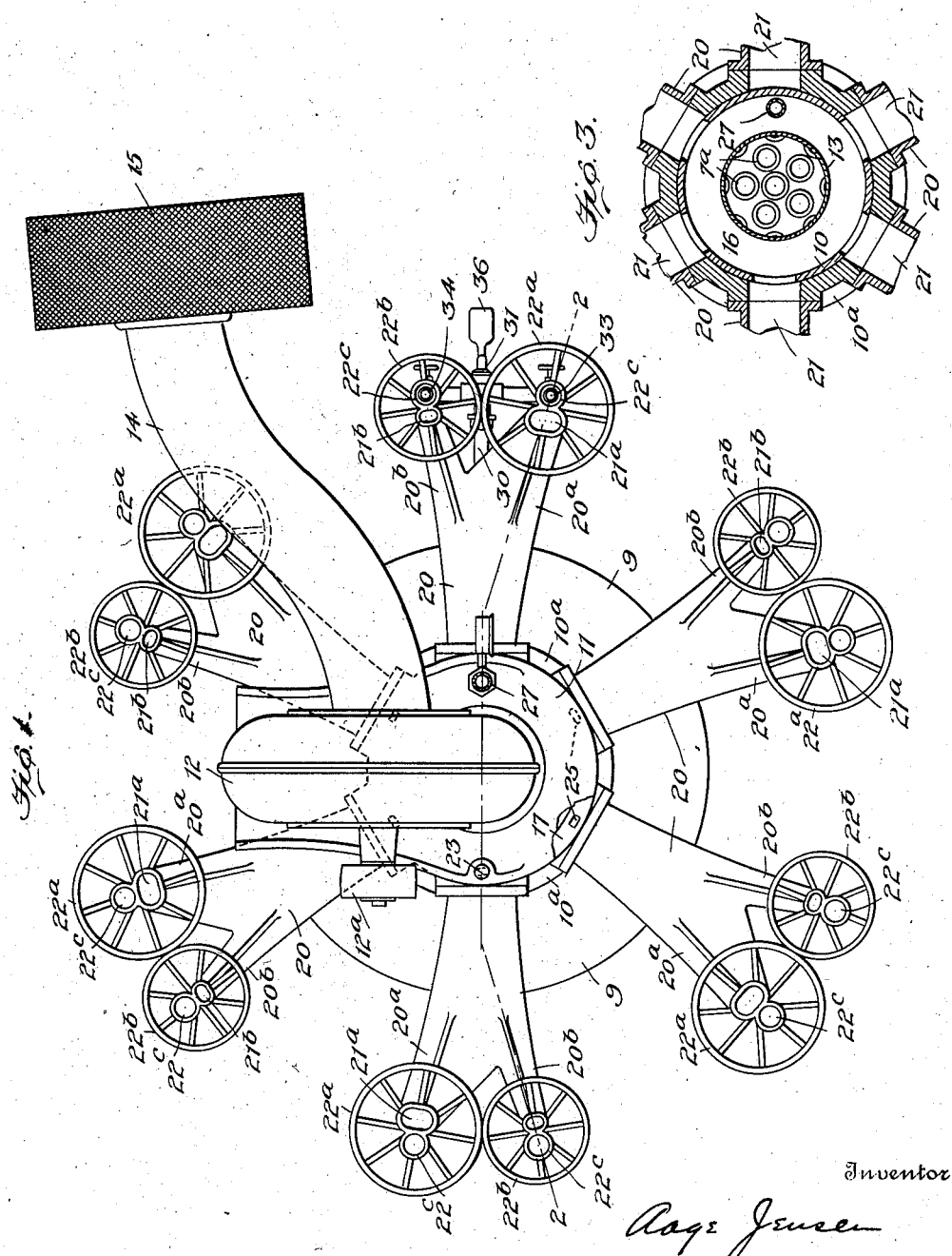

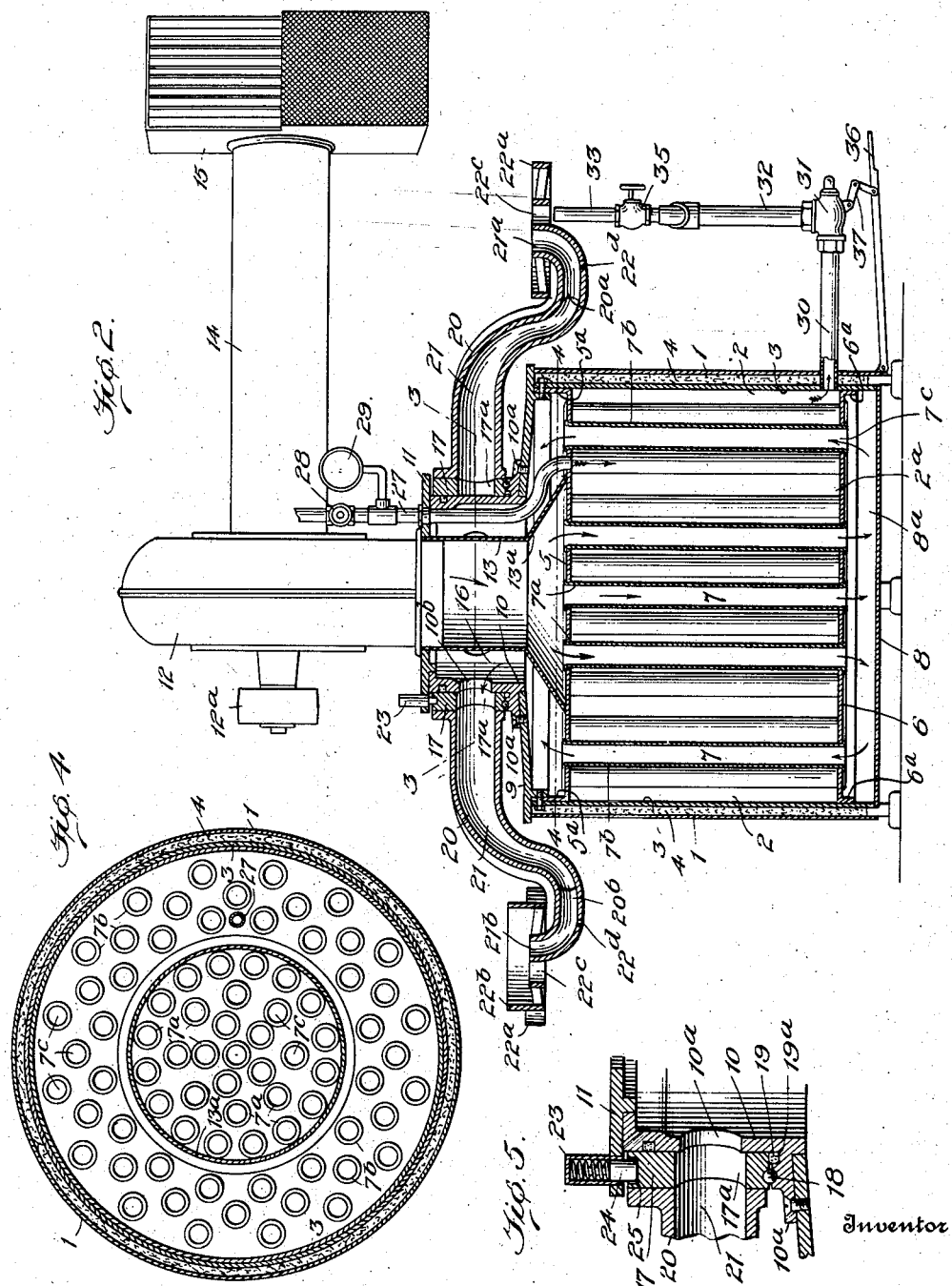

AAGE JENSEN, OF LONG ISLAND CITY, NEW YORK.

STERILIZING METHOD.

1,276,659.  Specification of Letters Patent.  Patented Aug. 20, 1918.

Application filed November 9, 1915, Serial No. 60,609. Renewed July 2, 1918. Serial No. 243,089.

*To all whom it may concern:*

Be it known that I, AAGE JENSEN, a citizen of the United States, residing at Long Island City, in the county of Queens and State of New York, have invented a certain new and useful Sterilizing Method; and I do hereby declare the following to be a full, clear, and exact description thereof, reference being had to the accompanying drawings, forming part of this specification.

This invention relates generally to improvements in the sterilizing art. An example of the utility of the invention is in the sterilizing of milk cans after the contents have been removed and before the cans are refilled. Hence, for convenience, the following description will be confined to this particular use of the invention.

A dirty milk can is a particularly favorable breeding ground for bacteria. This is due not only to the unsanitary conditions to which the cans are subjected in shipment, but also to the nature of the contents of the can, which, as is well known, form a medium wherein bacteria of every description develop with amazing rapidity. When the cans have been emptied there is always a thin film or layer of milk adhering to the walls,—this film of milk frequently sour and alive with pathogenic bacteria. Consequently, to avoid pollution of the entire new supply of milk, it is absolutely essential that the can be thoroughly washed and presented for refilling in a sterile or very nearly sterile condition.

The so-called sterilizing methods at present generally employed in dairies, are not conducive to bringing about this most desirable condition. The common practice is to first immerse the cans in a sink and scrub them to remove the dirt clinging to the outer walls of the cans and the layer of milk or congealed animal fat remaining in the cans. Then the cans are steamed momentarily and set aside for refilling. This practice is very objectionable for the wash water in the sink quickly becomes polluted from the dirty water flowing off the cans, so that often the whole number of cans treated are affected. Again, the moisture remaining in the cans, after the steaming process, permits the rapid propagation of bacteria after the cans have been allowed to cool to atmospheric temperature, and often results in the formation of metallic oxids or other metal salts which react on the milk subsequently placed in the cans, so as to give it a metallic flavor. This metallic flavor can not be removed by pasteurizing and is a condition frequently found in milk used for city supply.

According to the present invention, the cans are separately rinsed or washed with sterile water which condition may be brought about by distillation or by raising the water to a sterilizing temperature. After the cans have been thoroughly washed they are steamed for a sufficient time to kill the remaining germ life and finally dried by flooding the cans with sterile air which may be either air sterilized by any well known method, or air heated to a sterilizing temperature, as disclosed in the present embodiment of the invention. During each step of the process absolute sterile conditions prevail and consequently practically all of the germ life has been removed from the treated cans. Furthermore, the cans are perfectly dry when the sterilizing process is completed, so that there is no danger of the subsequent formation of metallic oxids. This prevents the imparting of a metallic flavor to the milk in the cans and in addition greatly increases the life of the cans themselves.

The accompanying drawings illustrate a preferred form of apparatus for carrying out the improved method of the present invention.

In the drawings,—

Figure 1 is a plan view, partly in section, of the apparatus.

Fig. 2 is a side elevation, partly in section, on the line 2—2 of Fig. 1.

Fig. 3 is a horizontal section on the line 3—3 of Fig. 2.

Fig. 4 is a horizontal section on the line 4—4 of Fig. 2.

Fig. 5 is a detail view.

Like characters of reference in the several figures indicate the same parts.

As shown, the cylindrical wall 1 of the casing surrounds an inner chamber 2. The sides of said chamber may be inclosed by a cylindrical wall 3 suitably insulated from the outer wall of the casing, as shown at 4. Upper and lower heads 5, 6 are provided respectively with flanges 5ª, 6ª, whereby they may be secured to the cylindrical wall 3 of the chamber 2. Said heads form the top and bottom inclosing walls of the chamber. Within the chamber 2 are tubes 7 extending all the way through the upper and lower heads 5, 6. The tubes are open at both ends and may be secured to the heads 5, 6, by expanding their ends over the sides of suitable apertures in the heads, in the manner well known in the boiler construction art. Beneath lower head 6 of the chamber 2 is a bottom plate 8 secured to the cylindrical wall 3 of said chamber in any suitable manner. The spaces 7ᶜ inclosed by the several tubes 7 afford passages for the circulation of air and the spaces 2ᵃ between the tubes form a steam and condensation chamber. The space between lower head 6 and bottom plate 8 forms an air chamber 8ᵃ which permits air to circulate down through some of the tubes and up the others, as will presently appear.

The upper end of cylindrical wall 1 is closed by a cover plate 9 having a central throat or restricted passage 10 provided with a cap 11. Mounted above cap 11 is a blower 12 of suitable construction and the discharge end of which communicates with a duct 13 extending through cap plate 11 into throat 10 and having its lower end flared, as shown at 13ᵃ. The flared portion 13ᵃ of duct 13 rests on the upper head 5 of chamber 2. An air inlet pipe 14 is connected with the intake of the blower 12, and a suitable filter 15 connected with said inlet pipe extracts the dust and other foreign substances from the entering air. Blower 12 may be driven by a pulley 12ᵃ to which power is supplied from any suitable source, not shown.

Air is drawn in by the blower 12 and forced through duct 13 and into the open ends of the central tubes 7ᵃ, which are located on the inside of the flared end 13ᵃ of the duct. The air circulates down the central tubes into the air chamber 8ᵃ, from which it passes up the outer tubes 7ᵇ, the upper ends of which are on the outside of the lower flared end of the duct. These tubes direct the air into the space 16 between duct 13 and the outer walls of the casing.

Revolubly mounted around throat 10 of cover plate 9 is a sleeve 17. To reduce friction and allow the sleeve to turn easily, anti-friction bearings 18 are provided between the flange 10ᵃ of throat 10 and the lower end of the sleeve. A packing 19 of suitable material is also inserted in groove 19ᵃ of flange 10ᵃ to effect a tight seal and lubricate the parts during operation. Projecting from sleeve 17 is a series of hollow arms 20 with the inner end of the duct 21 in each arm communicating with a corresponding discharge port 17ᵃ in the sleeve 17. The outer end of each arm 20 is preferably forked, as shown in Fig. 1, whereby it is divided into two sections 20ᵃ, 20ᵇ. Each section is provided with a suitable bracket or table, one 22ᵃ of which is adapted to support the body of a milk can, and the other 22ᵇ of which supports the top of a milk can.

The discharge ends 21ᵃ, 21ᵇ of the duct 21 in arm 20 extend through the respective tables 22ᵃ, 22ᵇ, and form nozzles which direct blasts of air issuing from the space 16 into the can body or top, as the case may be. Tables 22ᵃ, 22ᵇ are provided with ports 22ᶜ through which water and steam may be injected into the cans, at the desired time. The water from the cans is allowed to run out through drip ports or openings 22ᵈ in the tables. Throat 10 is provided with a series of ports 10ᵇ adapted to register with the ports 17ᵃ in sleeve 17. The number of ports 10ᵇ, however, is less than the number of ports 17ᵃ in the sleeve, there being no port in the throat at the point where an arm 20 is in position for rinsing and steaming the can. Mounted within a small closed sleeve 23 in cap 11 is a downwardly spring pressed plunger 24. The lower end of said plunger 24 is adapted to fit into recesses 25 in the upper face of rotary sleeve 17 when the sleeve ports 17ᵃ are in registry with the ports 10ᵇ in throat 10. This construction provides a guide for informing the operator when the movable and stationary parts of the device are in operative relation to each other.

Steam is supplied to the steam passages 2ᵃ of chamber 2, by a steam supply pipe 27, the upper end of which projects through cap 11 and is provided with a regulating valve 28 and a fluid pressure gage 29 for informing the operator of the amount of fluid pressure within the steam passages 2ᵃ of the chamber. Connected with the lower end of the steam space or passages 2ᵃ is an outlet pipe 30 having a valve 31 which controls the supply of steam to the vertical pipe 32. Vertical pipe 32 is provided with branches or nozzles 33 and 34, one branch 33 of which is adapted to inject a column of fluid through a port 22ᶜ in table 22ᵃ, and the other branch 34 of which is adapted to inject a column of fluid through a similar port in the other table 22ᵇ. The flow of fluid through each branch separately may be controlled by valves 35. Valve 31 is preferably arranged for operation by a foot pedal 36 having operating connections 37 with the spindle of the valve. By regulating the size of the opening of the valve 31 the water of condensation in the steam space 2ᵃ may be kept at a given level without reducing the desired degree of pressure.

In operation, steam is first allowed to enter into the steam passages 2ᵃ by opening regulating valve 28, the valve being left open until the desired degree of pressure is obtained. Water is condensed in the lower portion of the steam passages and is under the pressure of the dry steam above. Fan 12 is then put in motion, thereby forcing air down through the central tubes 7ᵃ into the air chamber 8ᵃ up through the outer tubes 7ᵇ and out the ducts 21 in the arms 20, the air emitting at the discharge nozzles 21ª, 21ᵇ in a superheated condition. The body of a can to be treated is placed on a table 22ª in inverted position and the top of a can on table 22ᵇ, which are first positioned over nozzles 33 and 34. Valve 31 is then opened by pressing the foot pedal, which first results in the injection into the can of the water which has condensed in the steam passages. The water of condensation exhausting, the jet changes automatically to steam. When the can has been steamed for a sufficient time to destroy all the germ life, sleeve 17 is rotated to a position wherein a sleeve port is in registry with a port in throat 10. The sterilized air now enters the can in large volumes, thereby quickly absorbing all the moisture remaining from the rinsing and steaming processes. The can emerges from the treatment in a perfectly dry condition. The same operation is repeated until all of the cans have been treated. Revolving movement of the table carries the cans successively into positions wherein they are subjected to the air blast, until the treated cans are brought back to the operator who will take a position adjacent the water and steam nozzles 33, 34. The treated cans are removed and untreated cans placed on the tables.

In actual practice, it is preferable to maintain approximately one hundred pounds pressure within the steam passages of the chamber 2. With this pressure, the condensed water is injected into the cans at about 214° F., the water being absolutely sterile, because of its high temperature. The temperature of the air is always above 200° F., sometimes ranging as high as 240° F., so that the air is itself at a sterilizing temperature. It is obvious, however, that the temperatures of the several sterilizing agents employed in carrying out the process may be increased by increasing the steam pressure within the steam space 26. Much higher temperatures and pressures may be employed if desired.

What is claimed is:

1. A sterilizing method which consists in first washing the surface to be sterilized with water heated to a sterilizing temperature, then flooding the surface with steam until the surface is substantially sterile, and immediately thereafter, before corrosion of the wet sterile surface and propagation of germ life can take place, drying the wet sterile surface with air heated to a sterilizing temperature.

2. A sterilizing method which consists in first washing the surface to be sterilized with water, then flooding the surface with steam until the surface is substantially sterile, and immediately thereafter drying the wet sterile surface with previously sterilized air.

3. A sterilizing method which consists in first washing the surface to be sterilized with water, then flooding the surface with steam until the surface is substantially sterile, and immediately thereafter drying the wet sterile surface with filtered air heated to a sterilizing temperature.

AAGE JENSEN.